(12) United States Patent
Reeser et al.

(10) Patent No.: US 8,527,306 B1
(45) Date of Patent: *Sep. 3, 2013

(54) AUTOMATION AND SECURITY APPLICATION STORE SUGGESTIONS BASED ON CLAIMS DATA

(71) Applicant: State Farm Mutual Automobile Insurance Company, Bloomington, IL (US)

(72) Inventors: Andrew Reeser, Heyworth, IL (US); Shawn M. Call, Bloomington, IL (US); Stacy L. Kennedy, Bloomington, IL (US); Lee C. Drinan, Bloomington, IL (US); Lisa Ann Frey, Normal, IL (US); Kevin Payne, Lexington, IL (US); Michael Jacob, Le Roy, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,730

(22) Filed: Nov. 12, 2012

(51) Int. Cl.
*G06Q 40/00* (2012.01)
*G06Q 40/08* (2012.01)

(52) U.S. Cl.
CPC ...................... *G06Q 40/08* (2013.01)
USPC ............................................................ 705/4

(58) Field of Classification Search
USPC .................................. 705/4, 35–45
See application file for complete search history.

(56) References Cited

U.S. PATENT DOCUMENTS

| | | | |
|---|---|---|---|
| 6,912,505 B2 * | 6/2005 | Linden et al. ............ | 705/14.53 |
| 7,113,917 B2 | 9/2006 | Jacobi et al. | |
| 7,475,027 B2 * | 1/2009 | Brand ...................... | 705/7.29 |
| 7,809,601 B2 * | 10/2010 | Shaya et al. .............. | 705/7.31 |
| 7,860,759 B2 * | 12/2010 | Stoppelman ............. | 705/26.7 |
| 7,983,938 B1 * | 7/2011 | Hopkins ................... | 705/4 |
| 8,214,264 B2 * | 7/2012 | Kasavin et al. .......... | 705/26.7 |
| 8,306,908 B1 * | 11/2012 | Barker et al. ............ | 705/38 |
| 8,358,214 B2 * | 1/2013 | Amigo et al. ........... | 340/573.1 |
| 2002/0010625 A1 * | 1/2002 | Smith et al. ............. | 705/14 |
| 2002/0095269 A1 | 7/2002 | Natalini et al. | |
| 2003/0154120 A1 * | 8/2003 | Freishtat et al. ........ | 705/9 |
| 2003/0172005 A1 * | 9/2003 | Hellal et al. ............ | 705/27 |

(Continued)

OTHER PUBLICATIONS

Schafer, J. Ben et al. E- Commerce Recommendation Applications. Apr. 2001. Journal of Data Mining and Knowledge Discovery. vol. 5 Issue 1-2. pp. 115-153.*

(Continued)

*Primary Examiner* — Ella Colbert
*Assistant Examiner* — Stephanie M Ziegle
(74) *Attorney, Agent, or Firm* — Marshall, Gerstein & Borun LLP; Randall G. Rueth

(57) ABSTRACT

A method, system, and computer-readable medium that facilitate the reception of usage data about the utilization of an intelligent home system and insurance claims data and recommend intelligent home system products based on the claims data. The method, system, and computer-readable medium facilitate the analysis of the claims data to determine whether to recommend intelligent home system products and which, if any, intelligent home system products to recommend. Recommendations may be generated by comparing a user's usage data to the claims data. Recommendations may be generated by comparing the usage data to products related to the claims submitted by one or more similar claimants in the claims data. Recommendations may be presented to a user if the intelligent home system.

20 Claims, 6 Drawing Sheets

(56) References Cited

U.S. PATENT DOCUMENTS

| | | | |
|---|---|---|---|
| 2004/0059626 A1* | 3/2004 | Smallwood | 705/10 |
| 2006/0047608 A1* | 3/2006 | Davis et al. | 705/400 |
| 2006/0271405 A1* | 11/2006 | Cipolle et al. | 705/3 |
| 2007/0061197 A1* | 3/2007 | Ramer et al. | 705/14 |
| 2009/0222290 A1* | 9/2009 | Crowe | 705/4 |
| 2010/0094863 A1* | 4/2010 | Kenton-Dau et al. | 707/722 |
| 2011/0010342 A1* | 1/2011 | Chen et al. | 707/637 |
| 2011/0040785 A1 | 2/2011 | Steenberg et al. | |
| 2011/0046805 A1 | 2/2011 | Bedros et al. | |
| 2011/0137776 A1* | 6/2011 | Goad et al. | 705/34 |
| 2011/0238478 A1* | 9/2011 | Gottfurcht et al. | 705/14.25 |
| 2012/0117097 A1* | 5/2012 | Lam et al. | 707/758 |
| 2012/0245944 A1* | 9/2012 | Gruber et al. | 704/270.1 |
| 2012/0271653 A1* | 10/2012 | Mitchell et al. | 705/3 |
| 2012/0278091 A1* | 11/2012 | Yaseen et al. | 705/1.1 |
| 2012/0278127 A1* | 11/2012 | Kirakosyan et al. | 705/7.29 |
| 2012/0310771 A1* | 12/2012 | Selinger et al. | 705/26.7 |
| 2013/0046703 A1 | 2/2013 | Ambati et al. | |

OTHER PUBLICATIONS

Shardanand, Upendra et al. Social Information Filtering. Proceedings of ACM Conference on Human Factors in Computing Systems. 1995. vol. 1. pp. 210-217.*

Linden, Greg et al. Amazon.com Recommendations; Iten to Iten Collaborative Filtering. Industry Report. IEEE Computer Society. Jan. 2003. pp. 76.*

Cooke, Alan et al. Marketing the unfamiliar: The Role of Context and Item Specific Informaiton in Electronic Agent Recommendations. Journal of Marketing Research. Nov. 2002 pp. 488.*

Linden, Greg, et al., 'Amazon.com Recommendations—Item to Item Collaborative Filtering', Industry Report, IEEE Computer Society, 6 pages, Jan. 2003.

Non-Final Office Action for U.S. Appl. No. 13/674,726—17 pages, mailed Mar. 19, 2013.

* cited by examiner

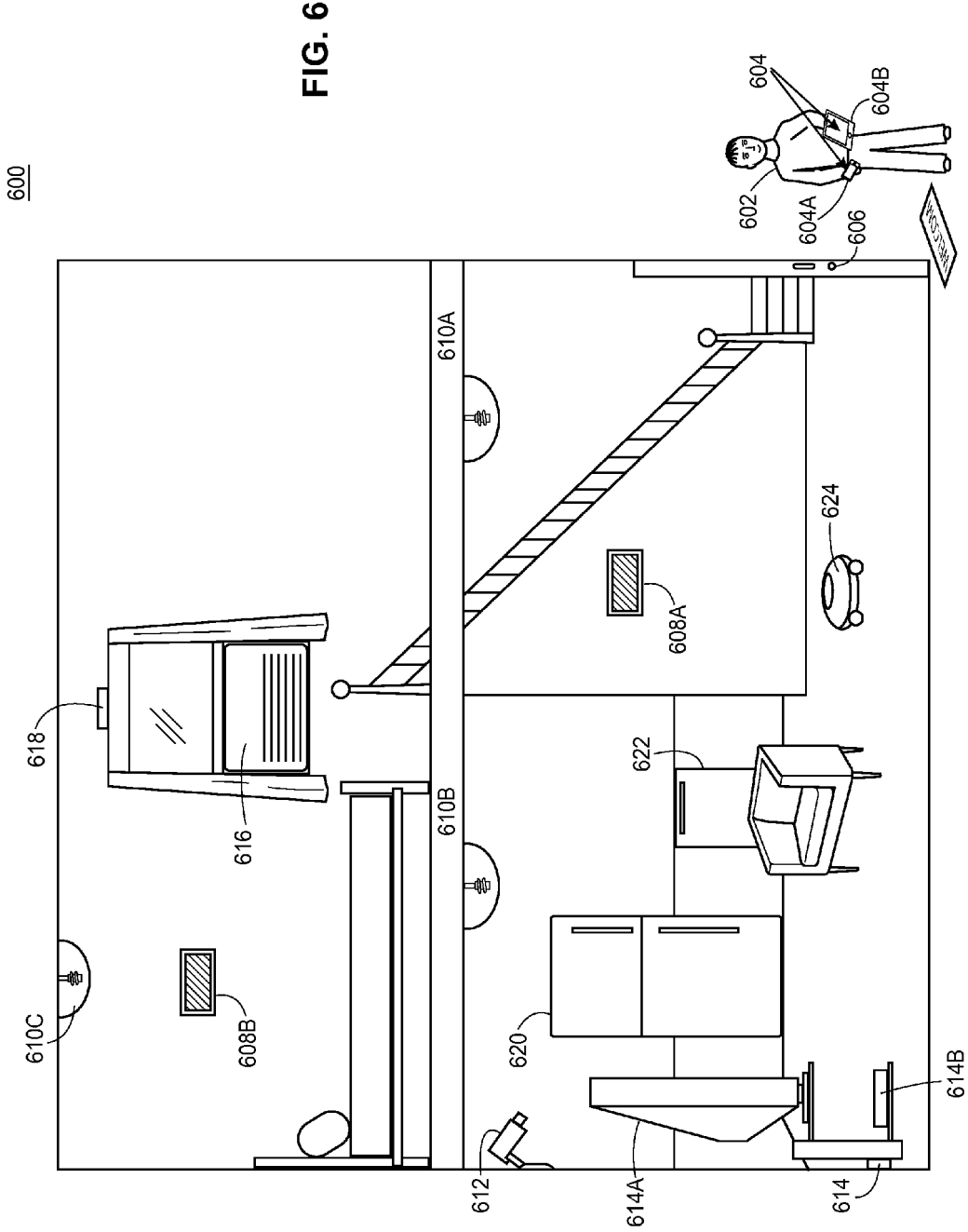

AUTOMATION AND SECURITY APPLICATION STORE SUGGESTIONS BASED ON CLAIMS DATA

FIELD OF INVENTION

This disclosure generally relates to computer networking, particularly the networking of automation and/or security products in a building or home.

BACKGROUND

As computer and computer networking technology has become less expensive and more widespread, more and more devices have started to incorporate digital "smart" functionalities. For example, controls and sensors capable of interfacing with a network can now be incorporated into devices such as appliances, security systems, light switches, and water valves. Such smart devices may be fully or partially integrated into a intelligent home or intelligent building system. These smart devices may be able to prevent or ameliorate losses leading to, for example, homeowner's or renter's insurance claims. However, for a smart device to be able to prevent or ameliorate a loss, the device must first be installed. After all, an automatic gas valve to stop gas flow to the stove will not prevent a fire in the kitchen from becoming explosive if the automatic gas valve is not present. Accordingly, it may be advantageous to recommend various smart devices to user of an intelligent home or intelligent building system based on the insurance claims of other users

SUMMARY OF THE DISCLOSURE

A method for recommending intelligent home system products to a user of an intelligent home system including: (1) receiving usage data about the user's utilization of the intelligent home system, wherein the intelligent home system includes a plurality of installed devices, and wherein the usage data is associated with a user account information, includes usage data about each of the plurality of installed devices, and is stored on a computer-readable medium; (2) receiving claims data about a plurality of insurance claims, wherein each insurance claim includes one or more of information about the loss or information about the claimant; (3) analyzing the usage data and claims data to identify one or more intelligent home system products to recommend to the user when it is determined to recommend one or more intelligent home system products; and (4) presenting to the user the one or more intelligent home system products when it is determined to recommend one or more intelligent home system products wherein steps (1) to (4) are performed using one of one or more processors.

In an embodiment, a computer system including: a processor; and a program memory storing executable instructions that when executed by the processor cause the computer system to: receive usage data about the user's utilization of the intelligent home system, wherein the intelligent home system includes a plurality of installed devices, and wherein the usage data is associated with a user account, includes usage data about each of the plurality of installed devices, and is stored on a computer-readable medium; receive claims data about a plurality of insurance claims, wherein each insurance claim includes one or more of information about the loss or information about the claimant; analyze the usage data to identify one or more intelligent home system products to recommend to the user when it is determined to recommend one or more intelligent home system products; and present to the user the one or more intelligent home system products when it is determined to recommend one or more intelligent home system products.

In another embodiment, a tangible, computer-readable medium storing executable instructions that when executed by a processor of a computer system cause the computer system to: receive usage data about the user's utilization of the intelligent home system, wherein the intelligent home system includes a plurality of installed devices, and wherein the usage data is associated with a user account, includes usage data about each of the plurality of installed devices, and is stored on a computer-readable medium; receive claims data about a plurality of insurance claims, wherein each insurance claim includes one or more of information about the loss or information about the claimant; analyze the usage data to identify one or more intelligent home system products to recommend to the user when it is determined to recommend one or more intelligent home system products; and present to the user the one or more intelligent home system products if when is determined to recommend one or more intelligent home system products.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 6 illustrates a block diagram of an exemplary home with intelligent home system products installed.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
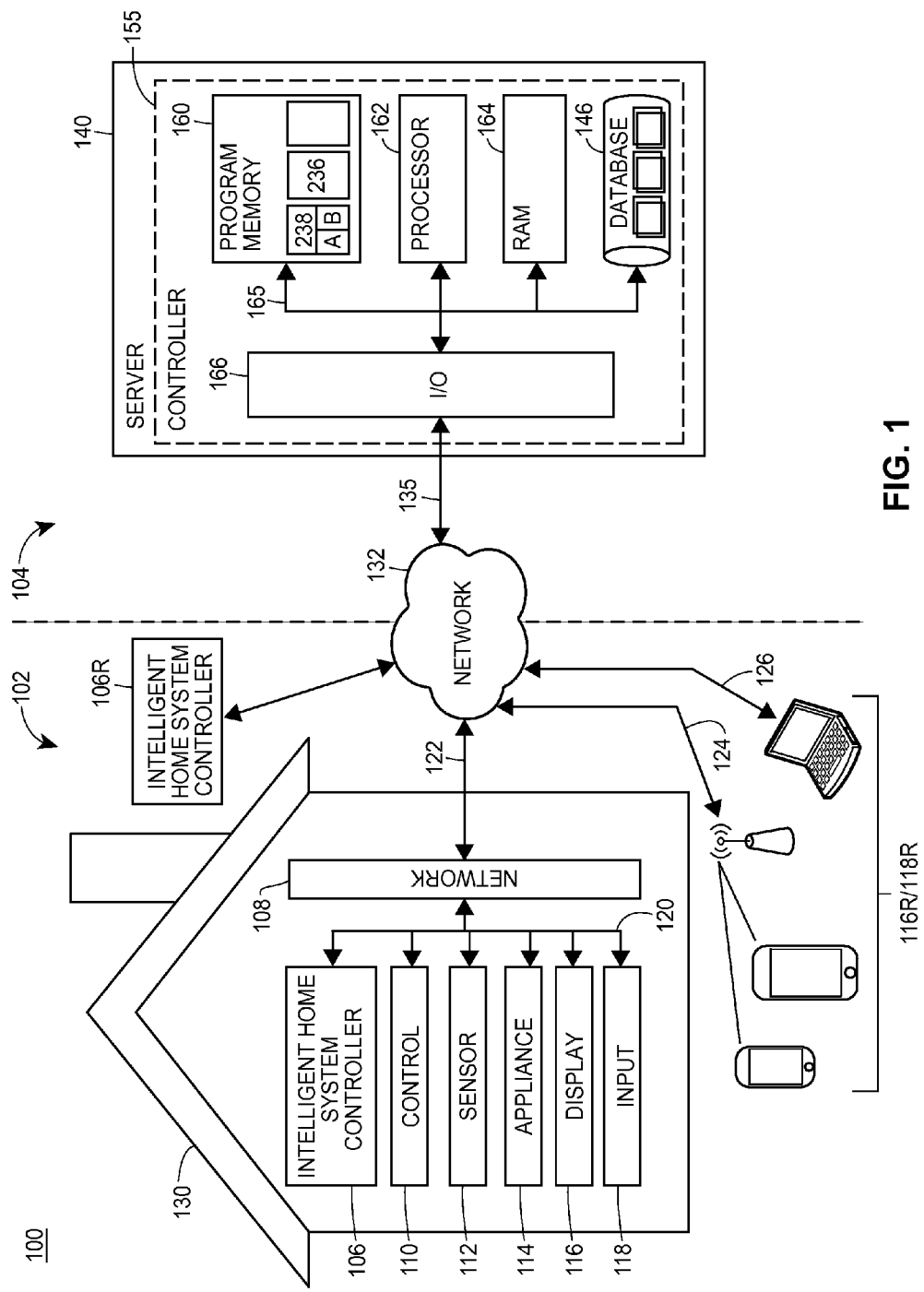
FIG. 1 illustrates a block diagram of a computer network, a computer server, an intelligent home system controller, and intelligent home system products on which an exemplary intelligent home product recommendation system and method may operate in accordance with the described embodiments.

FIG. 1 illustrates a block diagram of an exemplary intelligent home product recommendation system 100. The high-level architecture includes both hardware and software applications, as well as various data communications channels for communicating data between the various hardware and software components. The intelligent home product recommendation system 100 may be roughly divided into front-end components 102 and back-end components 104. The front-end components 102 are disposed within one or more homes 130. It will be appreciated that while the word "home" is used to refer to the site at which the exemplary embodiment is installed, the exemplary intelligent home product recommendation system 100 could be installed in any number of locations such as a single-family house, apartment, condominium, or even non-residential locations such as businesses or warehouses. Further, while some of the exemplary front-end components 102 are described as being disposed "within" a home, it will be understood that some or all of the front-end components 102 may be installed outside or nearby a home. Further still, some or all of the front-end components 102 (for example, the intelligent home system controller 106R discussed below) may be remote from the home 130 (e.g., the functions described here in as being performed by the intelligent home system controller 106 may be performed all or in part by products connected to the home 130 over the network 132 in a distributed processing or cloud computing arrangement). The front-end components 102 may include an intelligent home system controller 106, a control device 110, a sensor 112, an appliance 114, a display 116, and/or an input device 118. The front-end components 102 may be connected to each other via a link 120 and/or connected to a network 108 by the link 120. The link 120 may be a wired connection, a wireless connection (e.g., one of the IEEE 802.11 standards), an optical connection, etc.

Figure 2:
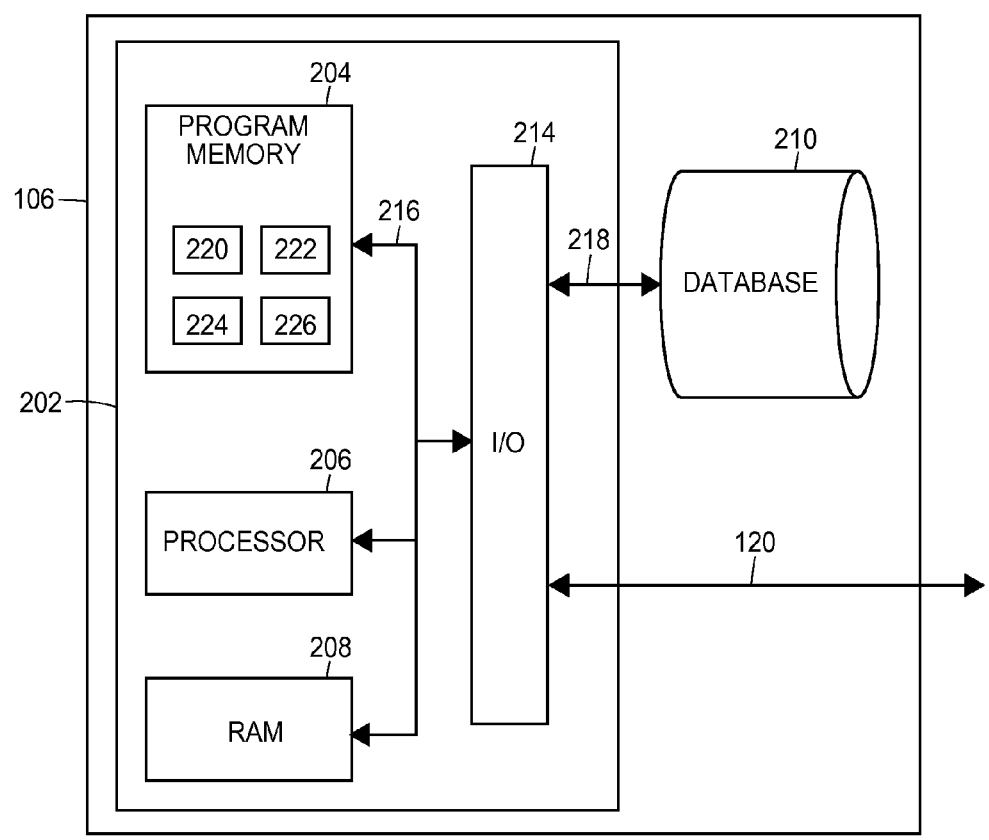
FIG. 2 illustrates a block diagram of an intelligent home system controller.

FIG. 2 illustrates a block diagram of an exemplary intelligent home system controller 106. The intelligent home system controller 106 may have a controller 202 that is operatively connected to the database 210 via a link 218. It should be noted that, while not shown, additional databases may be linked to the controller 202 in a known manner. The controller 202 may include a program memory 204, a processor 206 (may be called a microcontroller or a microprocessor), a random-access memory (RAM) 208, and an input/output (I/O) circuit 214, all of which may be interconnected via an address/data bus 216. It should be appreciated that although only one microprocessor 206 is shown, the controller 202 may include multiple microprocessors 206. Similarly, the memory of the controller 202 may include multiple RAMs 208 and multiple program memories 204. Although the I/O circuit 214 is shown as a single block, it should be appreciated that the I/O circuit 214 may include a number of different types of I/O circuits. The program memory 204 and/or the RAM 208 may include a graphical user interface 220, an intelligent home system application 222, a plurality of software applications 224, and a plurality of software routines 226. The graphical user interface 220 may be a set of instructions that when executed by the processor 206 cause the display(s) 116 and the input device(s) 118 to display information to a user and/or receive input from the user. As used herein, the terms "user" or "customer" refers to a user of the intelligent home product recommendation system described below and may be used interchangeably. The intelligent home system application 222 may be a set of instructions that when executed by the processor 206 cause the intelligent home system controller 106 to carry out the functions associated with the exemplary intelligent home product recommendation system 100 described herein. The RAM(s) 208 and program memories 204 may be implemented as semiconductor memories, magnetically readable memories, and/or optically readable memories, for example. The controller 202 may also be operatively connected to the network 108 via a link 120. The intelligent home system controller 106 further includes a database 210 or other data storage mechanism (e.g., one or more hard disk drives, optical storage drives, solid state storage devices, etc.). The database 210 is adapted to store data related to the operation of the intelligent home product recommendation system 100. Such data might include, for example, customer data collected by the intelligent home system controller 106 from the intelligent home products 110, 112, 114, 116, 118 pertaining to the intelligent home product recommendation system 100 such as sensor data, power usage data, control data, input data, other data pertaining to the usage of the intelligent home products, user profiles and preferences, application data for the plurality of applications 224, routine data for the plurality of routines 226, or other kinds of data. The intelligent home system controller 106 may access data stored in the database 210 when executing various functions and tasks associated with the operation of the intelligent home product recommendation system 100.

Referring again to FIG. 1, as an alternative to or in addition to the intelligent home system controller 106, a remote intelligent home system controller 106R may be used to replace or augment the functions of the intelligent home system controller 106. The remote intelligent home system controller 106R may be a computer system or server connected to the network 132 by link 128. Further, the remote intelligent home system controller 106R may be implemented using distributed processing or "cloud computing" wherein the functions of the remote intelligent home system controller 106R may be performed by one or more computers or servers connected to the network 132. The remote intelligent home system controller 106R may be implemented a server 140 in the back end 104 or in a similar server in the front end 102.

A control device 110 may be any of a number of devices that allow automatic and/or remote control of systems in the home 130. For example, the control device 110 may be a thermostat that can be adjusted according to inputs from the intelligent home system controller 106 to increase or decrease the temperature in the home 130. Such a thermostat may control the temperature in a room and/or the entire home 130. The control device 110 may also be a light switch that can be adjusted according to inputs from the intelligent home system controller 106 to turn on, turn off, brighten, and/or dim lights in the home. Such light switches may be coupled to all the lights in a room and/or an individual light fixture. The control device 110 may be an automated power outlet that can be adjusted according to inputs from the intelligent home system controller 106 to apply power and/or remove power from an outlet. Such an automated power outlet may, for example, allow for remote turning off of a television that was left on with a user command, automatic turning off of an electric stove that was left on after a threshold amount of time has elapsed since motion was detected in the home 130, automatic turning on of a lamp when motion is detected in the room, etc. Similarly, the control device 110 may be an automated circuit breaker that can be adjusted according to input from the intelligent home system controller 106 to automatically and/or remotely apply or remove power to the entire home 130. The control device 110 may be an automated water valve that can be adjusted according to inputs from the intelligent home system controller 106 to adjust the flow of water in and around the home 130 (e.g., turning on or turning off sprinklers, turning on a pump to prevent the basement from flooding, etc.). The control device 110 may be an automated gas valve that can be adjusted according to input from the intelligent home system controller 106 to adjust the flow of gas in and around the home 130. Such an automated gas valve may, for example, allow for automatic and/or remote shutting off of gas during a fire or earthquake, etc.

The sensor 112 may be any of a number of sensors that may gather information about conditions in the home 130 and/or activities in the home 130. For example, the sensor 112 may be a smoke detector which may send an input to the intelligent home system controller 106 indicating the presence of smoke in the home 130. The sensor 112 may also be a part of the thermostat discussed above which may send input to the intelligent home system controller 106 indicating the temperature in the home 130. The sensor 112 may be a water sensor which may send input to the intelligent home system controller 106 indicating, for example, the flow rate of a faucet, the presence of water in the basement, a roof leak in the attic, whether the sprinkler system is turned on, etc. The sensor 112 may be an energy monitor which may measure the power usage of a light fixture, an appliance, an entire room, the entire home 130, etc. The sensor 112 may be any of a number of security sensors. Such security sensors may include motion sensors, door sensors (to detect the opening, closing, and/or breaking of a door), window sensors (to detect the opening, closing, and/or break of a window), etc. The sensor 112 may be a camera and/or a microphone which may send visual and/or audible input to the intelligent home system controller 106.

The appliance 114 may be any of a number of appliances that may be present in the home 130 and communicating with the intelligent home system controller 106. Each appliance 114 may be a "smart" appliance. For example, the appliance 114 may have an integrated computer system that helps to optimize the operation of the appliance 114. Such an integrated computer system may assist, for example, with scheduling usage of the appliance (e.g., a smart dishwasher that will wait to run the dishwashing cycle until off-peak hours), sending usage reports to the intelligent home system controller 106, sending sensor data to the intelligent home system controller 106, receiving commands from the intelligent home system controller 106, etc. An appliance 114 may be a refrigerator, dishwasher, a washing machine, a dryer, an oven, stove, a microwave, a coffeemaker, a blender, a stand mixer, a television, a video game console, a cable box or digital video recorder, etc. Additionally, an appliance 114 may also be a household robot (e.g., a robotic vacuum cleaner).

The display 116 may be any of a number of visual and/or audible output devices that may be used to display output from the intelligent home system controller 106. Such output may include sensor readings, alarm messages, alerts, reports on the usage of various system in the home (e.g., electricity, water, etc), a list of supplies to purchase (e.g., a smart refrigerator has reported that the milk and eggs are running out and recommends to purchase some of each), video or images from a camera, a user interface operating in conjunction with the input device 118, etc. The display 116 may also display data generated outside the home 130, such as information about weather conditions, public safety announcements, sports scores, advertisements, television channels, videos, etc. The display 116 may be a monitor (e.g., an LCD monitor, a CRT monitor), a television, a screen integrated into a control panel of the intelligent home system controller 106, a screen integrated into an appliance 114, etc. The display 116 may be used to present a graphical user interface 220 with which the user can interact with the intelligent home system controller 106. Additionally, the display 116 may also include or be connected to speakers (not shown). Such speakers may be used to present information from the intelligent home system controller 106, for example, in connection with the graphical user interface 220, an audible alarm, etc. The display 116 may also be a display that is remote from the home 130. For example, the display 116 may be a remote display 116R (e.g., a smartphone, tablet computer, or personal computer, etc) that sends and receives information over the network 132 over a wireless connection 124 (e.g., a cellular network connection, an 802.11 connection) or a wired connection 126. The remote display 116R may include a user interface to display information about the intelligent home system to a user via an application installed on the smartphone, tablet computer, or laptop computer. The remote input device 116R may receive information from the intelligent home system controller 106 and display information about one or more of the control device 110, sensor 112, appliance 114, display 116, or input device 118. For example, a user may use the application on his smartphone 116R to receive an alert from the intelligent home system controller 106 over the wireless connection 124. Of course, it will be understood that devices other than a smartphone, tablet computer, or personal computer may be a remote input device 116R.

The input device 118 may be any of a number of input devices that may be used to input data and/or commands to the intelligent home system controller 106. For example, the input device 118 may be a keyboard, mouse, remote control, etc. The input device 118 may also be integrated with the display 116, for example, as a touchscreen. The input device 118 may also be a microphone which can receive verbal commands from a user. The input device 118 may be used to receive commands in connection with the graphical user interface 220, the intelligent home system application 222, and/or any other applications or routines associated with the exemplary intelligent home product recommendation system 100. The input device 118 may be a remote input device 118R (e.g., a smartphone, tablet computer, or personal computer, etc) that sends and receives information over the network 132 over a wireless connection 124 (e.g., a cellular network connection, an 802.11 connection) or a wired connection 126. The remote input device 118R may receive user input via an application installed on the smartphone, tablet computer, or laptop computer that may present a user interface to display information about the intelligent home system and receive user input. The remote input device 118R may send commands (e.g., activate, deactivate, toggle, etc.) to the intelligent home system controller 106 to affect one or more of the control device 110, sensor 112, appliance 114, display 116, or input device 118. For example, a user may use the application on his smartphone 118R to turn off his stove over the wireless connection 124. Of course, it will be understood that devices other than a smartphone, tablet computer, or personal computer may be a remote input device 118R.

The front-end components 102 communicate with the back-end components 104 via the network 132. For example, the intelligent home system products 106-118 situated in the home 130 may be connected to the network 132 via the home network 108 and the link 122. The link 122 may be a wired connection, a wireless connection (e.g., one of the IEEE 802.11 standards), an optical connection, etc. The remote products 106R, 116R, 118R may be similarly connected to the network 132 over respective links 128, 124, and 126. The network 132 may be a proprietary network, a secure public internet, a virtual private network or some other type of network, such as dedicated access lines, plain ordinary telephone lines, satellite links, combinations of these, etc. Where the network 132 comprises the Internet, data communications may take place over the network 132 via an Internet communication protocol. The back-end components 104 include a server 140. The server 140 may include one or more computer processors adapted and configured to execute various software applications and components of the intelligent home product recommendation system 100, in addition to other software applications.

Similarly to the intelligent home system controller 106, the server 140 may have a controller 155 that is operatively connected to the database 146 via a link 156. It should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 132 via a link 135. The server 140 further includes a database 146 or other data storage mechanism (e.g., one or more hard disk drives, optical storage drives, solid state storage devices, etc.). The database 146 is adapted to store data related to the operation of the intelligent home product recommendation system 100. Such data might include, for example, customer data collected by the intelligent home system controller 106 pertaining to the intelligent home product recommendation system 100 and uploaded to the server 140 such as data pertaining to the usage of the intelligent home products, data pertaining to insurance claims filed by customers, customer profiles, information about various intelligent home products that are available for installation, web page templates and/or web pages, or other kinds of data. The server 140 may access data stored in the database 146 when executing various functions and tasks associated with the operation of the intelligent home product recommendation system 100.

As shown in FIG. 1, the program memory 160 and/or the RAM 164 may store various applications for execution by the microprocessor 162. For example, a user-interface application 236 may provide a user interface to the server 140. The user interface application 236 may, for example, allow a network administrator to configure, troubleshoot, or test various aspects of the server's operation, or otherwise to access information thereon. A server application 238 operates to transmit and receive information from one or more intelligent home system controllers 106 on the network 132. The server application 238 may aggregate usage and/or claims data and select intelligent home system products to recommend to the user as discussed herein. The server application 238 may be a single module 238 or a plurality of modules 238A, 238B. While the server application 238 is depicted in FIG. 1 as including two modules, 238A and 238B, the server application 238 may include any number of modules accomplishing tasks related to implantation of the server 140. By way of example, the module 238A may populate and transmit the client application data and/or may receive and evaluate inputs from the user to receive a data access request, while the module 238B may communicate with one or more of the back end components 104 to fulfill a data access request.

Although the intelligent home product recommendation system 100 is shown to include one server 140, one home 130, one intelligent home system controller 106, one control device 110, one sensor 112, one appliance 114, one display 116, and one input device 118 it should be understood that different numbers of servers 140, homes 130, intelligent home system controllers 106, control devices 110, sensors 112, appliances 114, displays 116, and input devices 118 may be utilized. For example, the system 100 may include a plurality of servers 140 and hundreds of homes 130, all of which may be interconnected via the network 132. Further, each home 130 may include more than one of each of an intelligent home system controller 106, a control device 110, a sensor 112, an appliance 114, a display 116, and an input device 118. For example, a large home 130 may include two intelligent home system controllers 106 that are connected to multiple control devices 110, multiple sensors 112, multiple appliances 114, multiple displays 116, and/or input devices 118. Additionally several homes 130 may be located, by way of example rather than limitation, in separate geographic locations from each other, including different areas of the same city, different cities, or different states. Furthermore, the processing performed by the one or more servers 140 may be distributed among a plurality of servers in an arrangement known as "cloud computing." According to the disclosed example, this configuration may provide several advantages, such as, for example, enabling near real-time uploads and downloads of information as well as periodic uploads and downloads of information.

Figure 3:
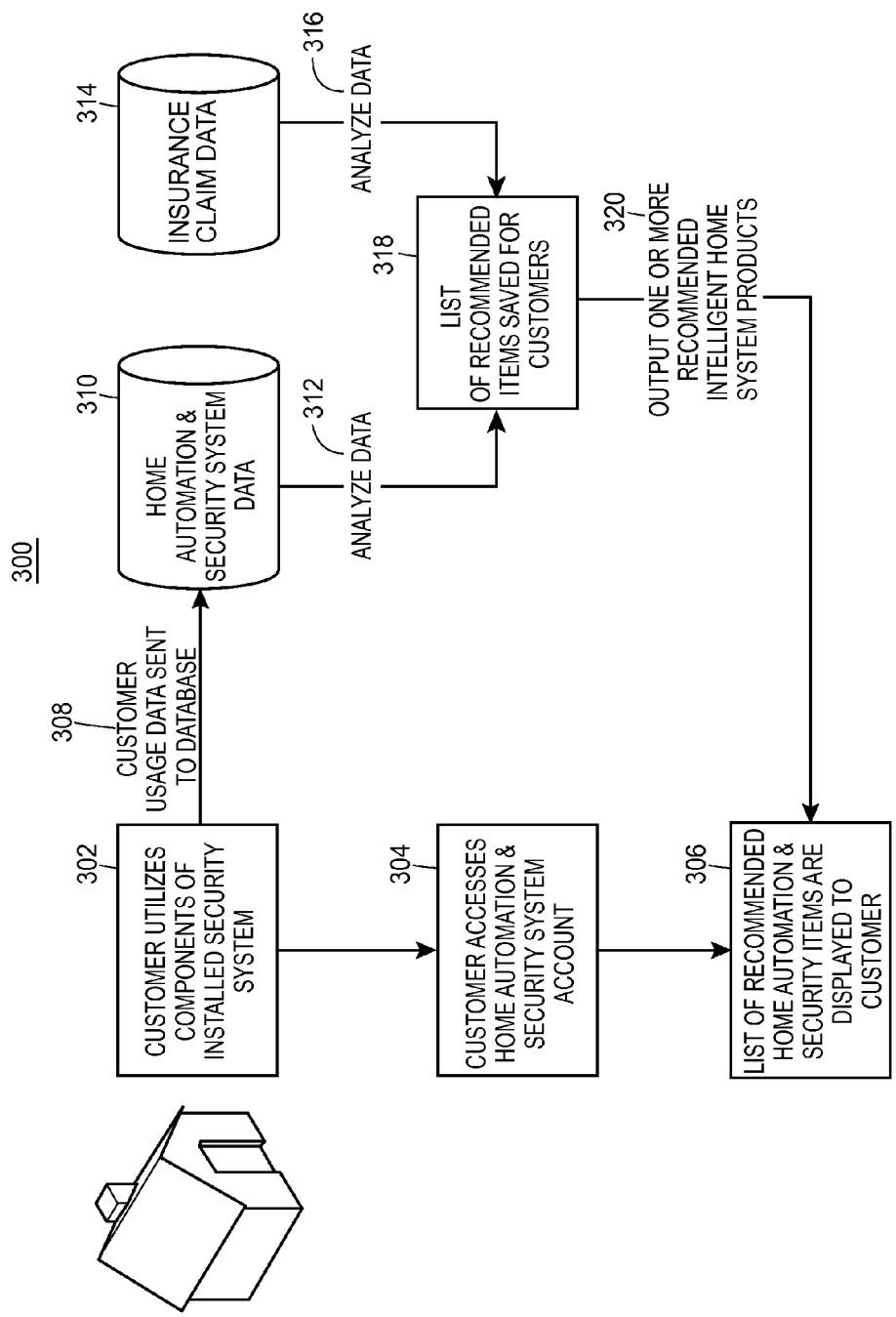
FIG. 3 illustrates an exemplary intelligent home product recommendation method for implementing the intelligent home product recommendation system in accordance with the presently described embodiments.

FIG. 3 is a block diagram of an exemplary intelligent home system product recommendation method 300 implemented on the system 100. One or more customers who live in a home 130 may utilize the devices 106-118 as described herein (block 302). The system 100 monitors the usage of the devices 106-118 and records customer usage data as described herein. The customer may then use the user interface 220 and access his or her account (block 304). For example, the user interface 220 may be used by customers to purchase additional products, pay bills, adjust settings for products already installed, access third party information, etc. The customer's usage data may be transmitted to the server 140 (or other back-end 104 component) for processing over the network 132 (block 308). Such transmissions may occur as the data is generated or may occur during low utilization times of the front-end components 102 (e.g., late at night when many devices may be turned off). Further, such transmissions may occur sporadically and/or periodically. After receiving the customer's usage data, the server 140 may store the usage data (block 310) and analyze the usage data (block 312). Additionally, the server 140 may also receive insurance claim data (block 314) and analyze the insurance claim data (316). The server 140 may then use the analyzed usage data and analyzed insurance claim data to generate a recommended products list (block 318) and output one or more recommended products (block 320). The activities associated with blocks 310-320 are discussed with further detail below in relation to FIG. 4. The display of one or more recommended products may occur at a one of the displays 116 at the user interface 220 discussed above or it may be over a web browser on a personal computer unconnected to the system 100 (block 306). Furthermore, recommendations may be displayed using direct mail or other printed materials in addition or as an alternative to display on a computer screen. The recommended product list may be presented as a sidebar, box, pop-up, featured item, etc. on a user interface 220 associated with the system 100.

Figure 4:
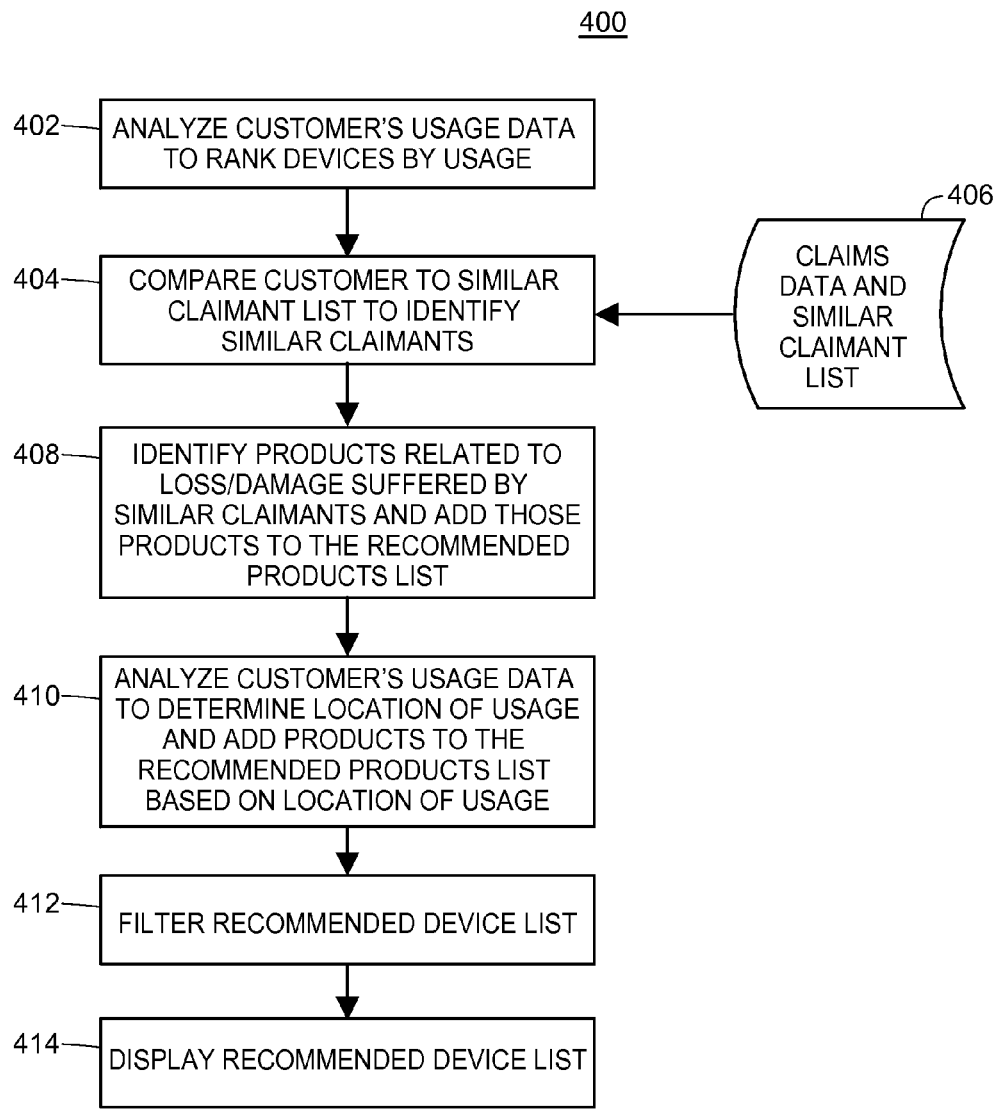
FIG. 4 illustrates an exemplary intelligent home product recommendation back-end method for implementing the intelligent home product recommendation system in accordance with the presently described embodiments.

FIG. 4 is a block diagram of an exemplary intelligent home system product recommendation back-end method 400 implemented on the system 100 in blocks 310-320 as shown in FIG. 3. Particularly the method 400 may be performed on the server 140. The server 140 may analyze the customer's usage data and rank the products by usage (block 402). The usage data may be associated with user account data. The user account data may contain biographical (e.g., name, insurance policy number), demographic (e.g., age, gender, marital status, number of children/pets, etc.), economic (e.g., yearly household income, net worth, etc.), and geographic (e.g., the address of the claimant, latitude and longitude of the claimant, the elevation of the claimant, etc.) information about the user. The products may be ranked according to frequency of use. For example, in an embodiment wherein a particular home 130 includes an outlet control module, a light control module, and a motion sensor and the usage log indicates that the light control module is used more frequently than the outlet control module, then the light control module may be ranked before the outlet control module. It may be beneficial to rank the products in the customer's system to determine which products are most useful to the customer and for which the user may be more likely to entertain a recommendation to upgrade or buy a related product. However, it will be understood that some kinds of products such as interior light switches may be used more frequently than other products such as automated outdoor security cameras because a user is expected to have more interaction with the former. To account for this known difference, it may be advantageous to weigh the usage rankings either by using the user's historical data or by using data from the usage of many customers. Accordingly, the ranked customer product list may be able to detect an increase or decrease in the usage of one or more products in the former case and to detect an extraordinary amount of usage in the latter case. Additionally, the ranked customer product list may be an M-dimensional vector, where M is the number of products installed in the home 130. The vector may be comprised of a sum of dimensions each multiplied by coefficients (e.g., representing weighed or unweighted usage metrics as discussed above). Thus, a more used product may have a greater effect on the vector than a less used product.

The server 140 may next access a database of claims data and a similar claimant list (block 404). The similar claimant list (block 406) may be generated using some or all of the claims data previously received by the server 140 (or other back-end 104 component). As customers of an insurance company submit claims for losses, the server 140 (or other back-end 104 component) may store claim data about each claim in a database 146. Claim data may include what kind of claim was submitted (e.g., homeowners, renters, flood, etc.), what kind of loss or damage was reported (e.g., flooding, fire, burglary), additional details about where the loss or damage occurred (e.g., flooding in the basement, rodent damage in the attic, termite damage to porch, etc.), etc. Additionally, claim data may include or be associated with biographical (e.g., name, insurance policy number), demographic (e.g., age, gender, marital status, number of children/pets, etc.), economic (e.g., yearly household income, net worth, etc.), and geographic (e.g., the address of the claimant, latitude and longitude of the claimant, the elevation of the claimant, etc.) information about the claimant. Alternatively, the biographical, demographic, economic, and geographic information about the claimant may be stored separately from the claims data but be referenced by the claims data. The claim data may be used in conjunction with any of a number of known algorithms such as collaborative filtering, cluster models, or search-based filtering to generate the similar claimant list.

Collaborative filtering may be implemented, for example, to create and compares N-dimensional vectors for each claimant and customer, where N is the number of entries for biographical, demographic, economic, and geographic information about the claimants and customers. For example, a claimant vector for Claimant A may include the following:

> 28 age+1 marital+0 children+1 pet+$60000 income+ 30.2837° N lat+97.7325° W long+489 ft elevation A claimant vector for Claimant B may include the following:

> 40 age+1 marital+2 children+2 pet+$100000 income+ 41.9480° N lat+87.6557° W long+597 ft elevation Similarly to the claimants in the claims data, an N-dimensional vector may be created for U, the user being provided a recommendation. For example:

> 32 age+1 marital+1 children+2 pet+$150000 income+ 32.7478° N lat+97.0928° W long+430 ft elevation The vectors for Claimant A and Claimant B may be compared (e.g., using a mathematical operation such as the sine or cosine of the vectors) to the vector for U to determine which vector is most similar to U. Of course, it will be understood that many more (e.g., hundreds, thousands, etc.) claims and claimant vectors may be compared to the vector for U. Further, it will be understood that while an eight-dimensional vector is used in the example above, the N-dimensional vector may have a much higher number of dimensions (e.g., tens, hundreds, etc.). After comparing the user being provided a recommendation to the claimant vectors, the similar claimant list may be created to include all of the claimants that have vectors of sufficient similarity (e.g., the result of a mathematical operation used to compare the vectors is above a threshold value) to the vector for the user being provided a recommendation.

Additionally or alternatively, the similar claimant list may be created using a cluster model to assign each of the claimants to a cluster of claimants with similar characteristics. For example, claimants who are married, have children, and earn between $100,000 and $200,000 annually may be clustered together and claimants who are single, earn between $50000 and $100000 and live in Illinois may be clustered together. Further, claimants may be clustered according to the type or age of their homes, for example, claimants with fifteen-year-old two story homes with basement may be clustered together and claimants in condominiums may be clustered together.

Clusters may be created using known clustering or other learning algorithms. In such a cluster model, the similar claimants list may include the claimants in the same cluster and as the user being provided a recommendation. A search-based filtering algorithm may be used in addition or as an alternative. A search-based algorithm may draw on characteristics of the user being provided a recommendation (e.g., address, demographics, type/age of home, etc.) and search through the database of claimants to determine other customers that have similar characteristics. The search algorithm may rank each result according to search relevance according to known techniques. Each customer may therefore have an associated ranking of each claimant by search relevance. Thus, the similar claimant list may include the claimants with a search relevance above a threshold value. As discussed herein, the generation of the similar claimant list may be performed in real-time as the user accesses the system 100 or asynchronously. It may be advantageous to restrict the similar claimant list comparison automatically or by user control. For example, it may be advantageous to compare the usage of the user to the claims of a subset of similar claimants (e.g., similar claimants with similar types of homes 130). Further, the restriction may be inserted before and/or after the comparison is made (e.g., streamlining the similar claimant list if the similar claimant list is longer than a threshold number, narrowing the recommended products list to allow filtering by a subset of the similar claimant list, etc.).

Figure 5:
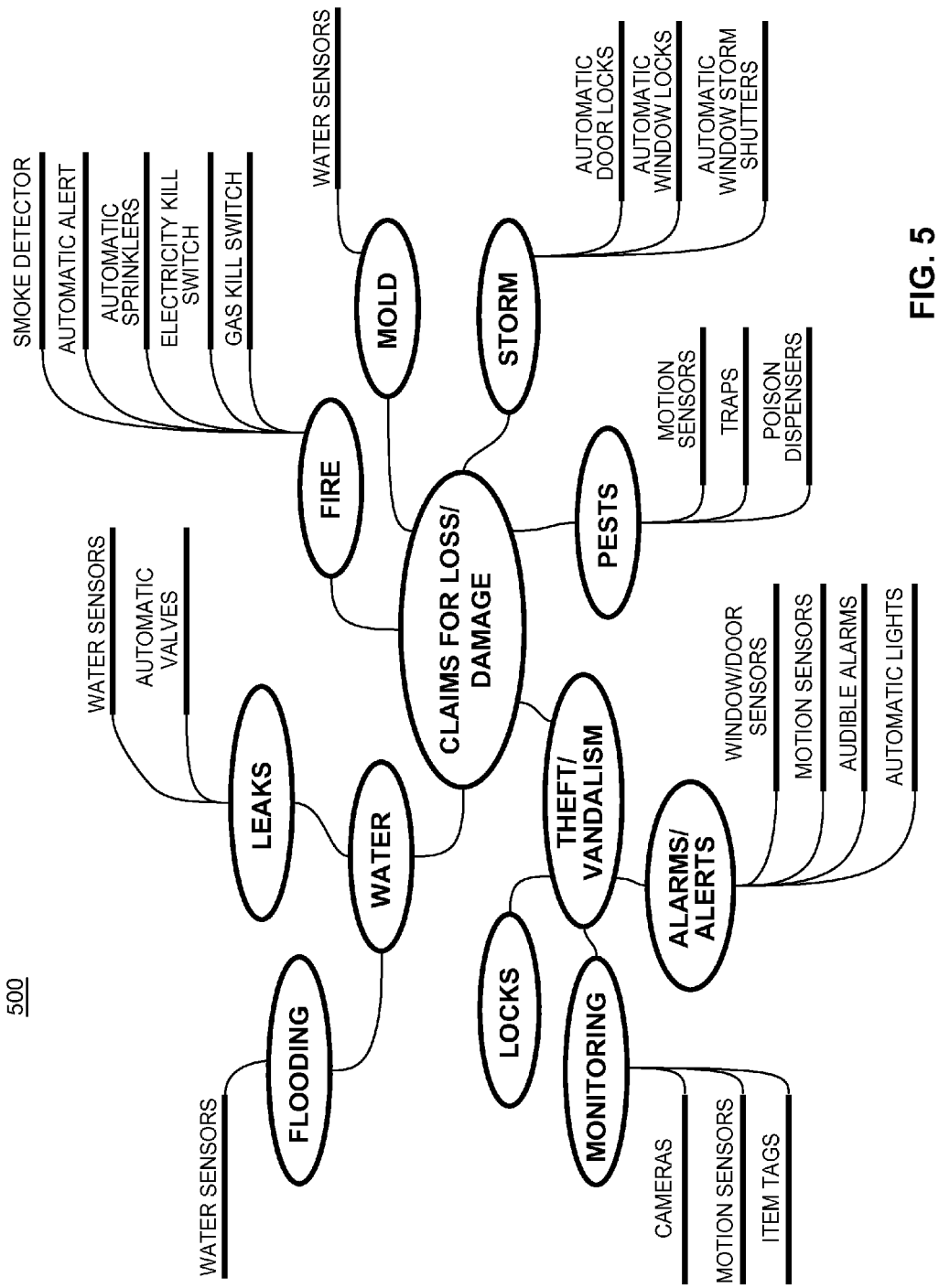
FIG. 5 illustrates an exemplary illustration of how various intelligent home system products may be related to a particular type of loss or damage.

With the similar claimant list and the claims filed by the similar claimants, the server 140 may identify products related to the loss or damage in the claims (block 408). FIG. 5 is an exemplary illustration 500 of how various intelligent home system products may be related to a particular type of loss or damage. Generally, intelligent home system products may be designed to prevent damage or loss (e.g., automatic locks, automatic storm doors); detect a source of damage or loss and to ameliorate the loss (e.g., security cameras, water sensors to detect a flooded basement), ameliorate damage (e.g., a gas kill switch to shutoff gas during a fire), detect theft and assist in the recovery of a lost item (e.g., tags on items such as RFID tags, etc.), etc. Thus, each intelligent home system product may be associated with a source of the loss (e.g., fire, water, etc.) and how the product may have affected the loss event (e.g., preventing, detecting). Of course, it will be understood that there may be other sources of loss, ways a product could affect the loss event, and intelligent home system products than those shown in FIG. 5. Referring again to FIG. 4, the server 140 may identify the product(s) that may have affected the losses claimed by the claimants on the similar claimants list and add those product(s) to the recommended products list.

The server 140 may also analyze the customer's usage data to determine the location of each use (block 410). As discussed above, many of the front-end components 102 are disposed within a home 130 (e.g., a control 110, etc.). However, some intelligent home system products may be used outside the home 130 as well as inside the home 130. For example, a user may use a remote display 116R and/or a remote input device 118R (e.g., a smartphone, tablet computer, etc.). Additionally, a user may monitor more than one home 130 (e.g., a user may own a main residence and a vacation property, a user may be a property manager or landlord using the intelligent home system to monitor properties) with intelligent home system products.

The location of the use may be determined by a number of known methods including analyzing the internet protocol (IP) address of the product. For example, the IP address of the remote display 116R and/or remote input device 118R may indicate that the remote display 116R and/or remote input device 118R connected to the network 132 through one of the wireless connection 124 or wired connection 126, indicating use outside the house 130, rather than using the network 108 and connection 112, indicating use inside the house 130. Additionally, the system 100 may determine that there are two or more homes 130 associated with the user's account (e.g., there are two or more sets of related IP addresses). The location of the use may also be determined by analyzing the geographic coordinates of the remote display 116R and/or remote input device 118R as determined by components of the remote display 116R and/or remote input device 118R (e.g., a Global Positioning System receiver of a smartphone, etc.). The geographic coordinates of the use may be compared to the geographic coordinates of the home 130. If the geographic coordinates of the use differ from the geographic coordinates of the home 130 by a certain amount (e.g., >twenty feet), the server 140 may detect that the use occurred outside the home. The geographic coordinates of the use may also be determined using a flag or other settable variable (e.g. a "home identifier" flag) to associate various products 106-118 with a particular home 130. The home identifier flag may be a globally unique flag for each home 130 in the system 100 or unique for each home 130 associated with the user's account.

If the system 100 determines that one or more uses occurred outside the home 130, the system 100 may add one or more products to the recommended product list based on the claims data. For example, if a user's usage information indicates that the user owns two or more homes 130, the system 100 may perform a similar claimant list comparison as discussed above for each of the homes 130 separately because the needs of the two homes 130 may be different (e.g., one home 130 is a small, vacation beach house and the second home 130 is a larger, two-story home in a suburb). Additionally, if the usage indicates that the user has two homes 130 but does not use a remote display 116R and/or remote input device 118R, the system 100 may add a remote display 116R and/or remote input device 118R to the recommended product list. Further, if a user's usage indicates the user is a landlord or property manager, the system 100 may add to the recommended product list a remote display 116R and/or remote input device 118R with additional capabilities to aggregate information and alerts about the multiple properties.

After compiling a recommended products list, it may be advantageous to filter the recommended product list to avoid redundant recommendations (block 412). The server 140 may analyze the ranked product list to determine if one or more of the products on the recommended products list is already being used in the user's home 130. It may be advantageous to remove such products from the recommended products list. Additionally or alternatively, it may be advantageous to reorder the recommended product list by any of a number of known techniques in order to favor certain products relative to others. For example, the recommended product list may be reordered by favoring the most profitable products, favoring the most popular products, favoring products that would more easily integrate into the user's current intelligent home system (e.g., if a user currently has water sensors but no security system, recommending automatic water valves over motion sensors or cameras), etc. When the recommended product list is ready, it may be displayed to the customer (block 414). Portions of the method 400 may or may not be executed in real-time. For example, the analysis, loading, and comparing activities discussed in relation to blocks 402-412 may be conducted periodically independently of a customer's interaction with the user interface 220 described above. In order to make more efficient use of the server's 140 computing resources, it may be advantageous to perform the activities associated with blocks 402-412 asynchronously (i.e., not in real-time) and display the one or more recommended products. However, some servers 140 may have sufficient computing resources to perform more of the activities associated with the method 400 in real-time.

FIG. 6 is an exemplary diagram of an intelligent home system 600 installed in a home that may collect customer usage data to send to a server 140 (or other back-end component 104). A user 602 may remotely interact with the intelligent home system 600 using a mobile device 604. Such a mobile device 604 may include, for example, a mobile phone 604A, a tablet computer 604B, etc. The intelligent home system 600 may include an intelligent lock 606. Such an intelligent lock 606 may include a sensor to detect the state of the intelligent lock 606 (e.g., locked or unlocked) and/or a control mechanism to respond to commands from the intelligent home control system 100 (e.g., a remote command to lock the door). The intelligent home system 600 may include one or more intelligent home control panels 608 such as the downstairs home control panel 608A and the upstairs intelligent home control panel 608B as shown in FIG. 6. The intelligent home control panel 608 may include a display and/or input device (e.g., a touchscreen). Such an intelligent home control system panel 608 or a mobile device 604 may be used to receive user input to the intelligent home control system 100 as described above. The intelligent home system 600 may include one or more lights 610 (e.g., the three lights 610A, B, C as shown in FIG. 6). Such intelligent lights 610 may include a sensor component to detect, for example, when a light 610 is on or off, and/or a control component to allow remote control of the intelligent light 610. The intelligent home system 600 may also include a camera or motion sensor 612. The intelligent home system 600 may further include an intelligent outlet 614. Such an intelligent outlet 614 may include a sensor component to detect, for example, when the outlet 614 is on or off, and/or a control component to allow remote control of the intelligent outlet 614. The intelligent outlet 614 may be coupled to a television 614A and/or game system 614B. The intelligent outlet may therefore detect when the television 614A and/or game system 614B are turned on or off and/or allow the user 602 to remotely power on or power off either or both of the television 614A and game system 614B. The intelligent home system 600 may also include one or more air conditioner 616, window sensor 618, refrigerator 620, dishwasher 622, and/or robot vacuum cleaner 624. Some or all of the air conditioner 616, window sensor 618, refrigerator 620, and dishwasher 622 may be intelligent such that they are able to send a sensor data to the intelligent home system 600 and/or receive commands from the intelligent home system 600. Any possible components for the intelligent home system 600 that are not installed and are associated with a claim made by a another customer may lead to a recommendation to install the appropriate intelligent home system 600 component as described herein. For example, if the user 602 is a twenty-eight-year-old single male who lives alone in an urban area, the method 300 described above may compare the products used by the user 602 to the products associated with claims made by other young, single males in similar neighborhoods. In another example, the method 300 described above may compare the products used by the user 602 to the products associated with claims made by claimants in similar homes (e.g., two story homes with a basement and similar square-footage, etc.). By way of illustration, if customers similar to the user 602 have made claims for losses caused by theft, the method 300 may recommend to the user 602 a camera 612.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed:

1. A method for recommending intelligent home system products to a user of an intelligent home system comprising:
   recording, with one or more processors, usage data about the user's utilization of the intelligent home system, wherein the intelligent home system includes a plurality of installed devices, and wherein the usage data is associated with a user account information, includes usage data about each of the plurality of installed devices, and is stored on a non-transitory computer-readable medium;
   receiving, at one or more processors, claims data about a plurality of insurance claims for losses to property, wherein each insurance claim includes information about the loss and information about the claimant, wherein the information about the loss includes one or more of a type of claim, a type of loss, or a location of loss;
   analyzing, with one or more processors, the usage data and claims data to identify one or more intelligent home system devices to recommend to the user to install into the intelligent home system; and
   presenting to the user, with one or more processors, the one or more intelligent home system devices to recommend.

2. The method of claim 1, wherein analyzing the usage data and claims data to identify one or more intelligent home system devices to recommend includes comparing the usage data to a similar claimants list.

3. The method of claim 2, wherein the similar claimants list is assembled using one or more of collaborative filtering, a cluster model, or a search-based algorithm.

4. The method of claim 2, wherein analyzing the usage data and claims data to identify one or more intelligent home system devices to recommend further includes indentifying products related to the claims submitted by one or more similar claimants on the similar claimants list.

5. The method of claim 2, wherein the similar claimants list is assembled based on the user account information.

6. The method of claim 1, wherein analyzing the usage data and claims data to identify one or more intelligent home system devices to recommend includes recommending an intelligent home system product based on one or more locations associated with the usage data.

7. The method of claim 1, wherein analyzing the usage data and claims data to identify one or more intelligent home system devices to recommend includes not recommending intelligent home system devices that are in the plurality of installed devices.

8. A computer system comprising:
a processor; and
a program memory storing executable instructions that when executed by the processor cause the computer system to:
record usage data about the user's utilization of an intelligent home system, wherein the intelligent home system includes a plurality of installed devices, and wherein the usage data is associated with a user account information, includes usage data about each of the plurality of installed devices, and is stored on a non-transitory computer-readable medium;
receive claims data about a plurality of insurance claims for losses to property, wherein each insurance claim includes information about the loss and information about the claimant, wherein the information about the loss includes one or more of a type of claim, a type of loss, or a location of loss;
analyze the usage data and claims data to identify one or more intelligent home system devices to recommend to the user to install into the intelligent home system; and
present to the user the one or more intelligent home system devices to recommend.

9. The computer system of claim 8, wherein the executable instructions that when executed by the processor cause the computer system to analyze the usage data to identify one or more intelligent home system devices to recommend include instructions to compare the usage data to a similar claimants list.

10. The computer system of claim 9, wherein the similar claimants list is assembled using one or more of collaborative filtering, a cluster model, or a search-based algorithm.

11. The computer system of claim 9, wherein the executable instructions that when executed by the processor cause the computer system to analyze the usage data to identify one or more intelligent home system devices to recommend include instructions to indentify products related to the claims submitted by one or more similar claimants on the similar claimants list.

12. The computer system of claim 9, wherein the similar claimants list is assembled based on the user account information.

13. The computer system of claim 8, wherein the executable instructions that when executed by the processor cause the computer system to analyze the usage data to identify one or more intelligent home system devices to recommend include instructions to recommend an intelligent home system devices based on one or more locations associated with the usage data.

14. The computer system of claim 8, wherein the executable instructions that when executed by the processor cause the computer system to analyze the usage data to identify one or more intelligent home system devices to recommend include instructions to not recommend intelligent home system devices that are in the plurality of installed devices.

15. A non-transitory, computer-readable medium storing executable instructions that when executed by a processor of a computer system cause the computer system to:
record usage data about the user's utilization of an intelligent home system, wherein the intelligent home system includes a plurality of installed devices, and wherein the usage data is associated with a user account information, includes usage data about each of the plurality of installed devices, and is stored on a non-transitory computer-readable medium;
receive claims data about a plurality of insurance claims for losses to property, wherein each insurance claim includes information about the loss and information about the claimant, wherein the information about the loss includes one or more of a type of claim, a type of loss, or a location of loss;
analyze the usage data and claims data to identify one or more intelligent home system devices to recommend to the user to install into the intelligent home system; and
present to the user the one or more intelligent home system devices to recommend.

16. The non-transitory, computer-readable medium of claim 15, wherein the executable instructions that when executed by the processor cause the computer system to analyze the usage data to identify one or more intelligent home system devices to recommend include instructions to compare the usage data to a similar claimants list.

17. The non-transitory, computer-readable medium of claim 16, wherein the similar claimants list is assembled using one or more of collaborative filtering, a cluster model, or a search-based algorithm.

18. The non-transitory, computer-readable medium of claim 16, wherein the executable instructions that when executed by the processor cause the computer system to analyze the usage data to identify one or more intelligent home system devices to recommend include instructions to indentify devices related to the claims submitted by one or more similar claimants on the similar claimants list.

19. The non-transitory, computer-readable medium of claim 16, wherein the similar claimants list is assembled based on the user account information.

20. The non-transitory, computer-readable medium of claim 15, wherein the executable instructions that when executed by the processor cause the computer system to analyze the usage data to identify one or more intelligent home system devices to recommend include instructions to not recommend intelligent home system devices that are in the plurality of installed devices.

* * * * *